United States Patent [19]
Flachenecker et al.

[11] Patent Number: 5,062,031
[45] Date of Patent: Oct. 29, 1991

[54] SELF OSCILLATING POWER STAGE FOR INVERTED RECTIFIER POWER SUPPLY

[75] Inventors: Gerhard Flachenecker, Ottobrunn; Karl Fastenmeier, Munich; Heinz Lindenmeier, Planegg, all of Fed. Rep. of Germany

[73] Assignee: Erbe Elektromedizin GmbH, Tubingen, Fed. Rep. of Germany

[21] Appl. No.: 450,855

[22] Filed: Dec. 14, 1989

[30] Foreign Application Priority Data

Dec. 16, 1988 [DE] Fed. Rep. of Germany ....... 3842465

[51] Int. Cl.$^5$ .......................................... H02M 3/335
[52] U.S. Cl. ........................................ 363/16; 363/25; 363/97
[58] Field of Search ................. 323/271, 282; 363/16, 363/24, 25, 26, 97, 133, 134, 22, 23

[56] References Cited

U.S. PATENT DOCUMENTS

| | | | |
|---|---|---|---|
| 4,178,628 | 12/1979 | Shepard | 363/25 |
| 4,208,706 | 6/1980 | Suzuki et al. | 363/26 |
| 4,353,112 | 10/1982 | Rietveld et al. | 363/97 |
| 4,464,709 | 8/1984 | Barter | 363/16 |
| 4,535,399 | 8/1985 | Szepesi | 363/134 |
| 4,648,017 | 3/1987 | Nerone | 363/28 |
| 4,692,851 | 9/1987 | Attwood | 363/16 |
| 4,709,316 | 11/1987 | Ngo et al. | 363/97 |
| 4,720,667 | 1/1988 | Lee et al. | 323/271 |
| 4,730,242 | 3/1988 | Divan | 363/37 |
| 4,796,173 | 1/1989 | Steigerwald | 363/133 |
| 4,797,803 | 1/1989 | Carroll | 363/97 |
| 4,829,232 | 5/1989 | Erickson | 323/282 |

FOREIGN PATENT DOCUMENTS 0060519 10/1982 European Pat. Off. .
59-25580 9/1984 Japan .
2184901 1/1987 United Kingdom .

OTHER PUBLICATIONS

Hewlett Packard Journal, Aug. 1981, vol. 32, No. 8, pp. 2-7, 10.
Elektronik 4/25.2.1983, pp. 67-71.
Elektronik 15/26.7.1985, pp. 61-65.
Tietze, Schenk-7th Edition, Dec. 1985, pp. 538-569.

*Primary Examiner*—Steven L. Stephan
*Assistant Examiner*—Jeffrey Sterrett
*Attorney, Agent, or Firm*—Frishauf, Holtz, Goodman & Woodward

[57] ABSTRACT

A self-oscillating inverted rectifier has a series-resonant circuit connected between a load and the selector terminal of an electronically controllable switch, the other terminals of which are connected respectively to d.c. sources of different potential. Phase detection and feedback circuits provide a rectangular control wave for connecting and disconnecting the resonant circuit to each d.c. source only at null transits of the current in the resonant circuit. The feedback circuit includes a control circuit supplied with a regulation voltage, which may be derived from the load, whereby the switch is intermittently prevented from connecting the resonant circuit to energizing d.c. for an integral number of half cycles of the resonant frequency. The load may be a high-frequency electrosurgical device or, more generally, a rectifier circuit providing accurately regulated d.c. power to a variable load.

57 Claims, 9 Drawing Sheets

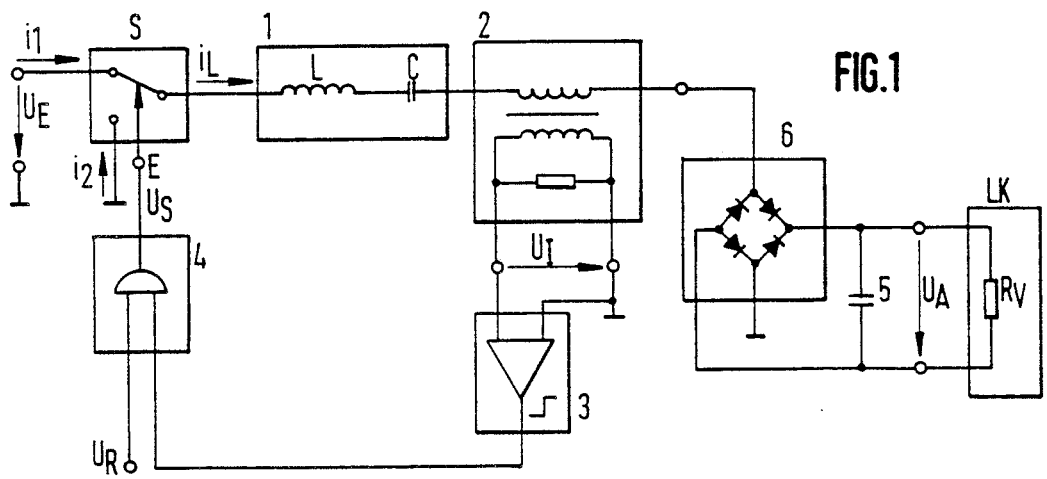
FIG.1
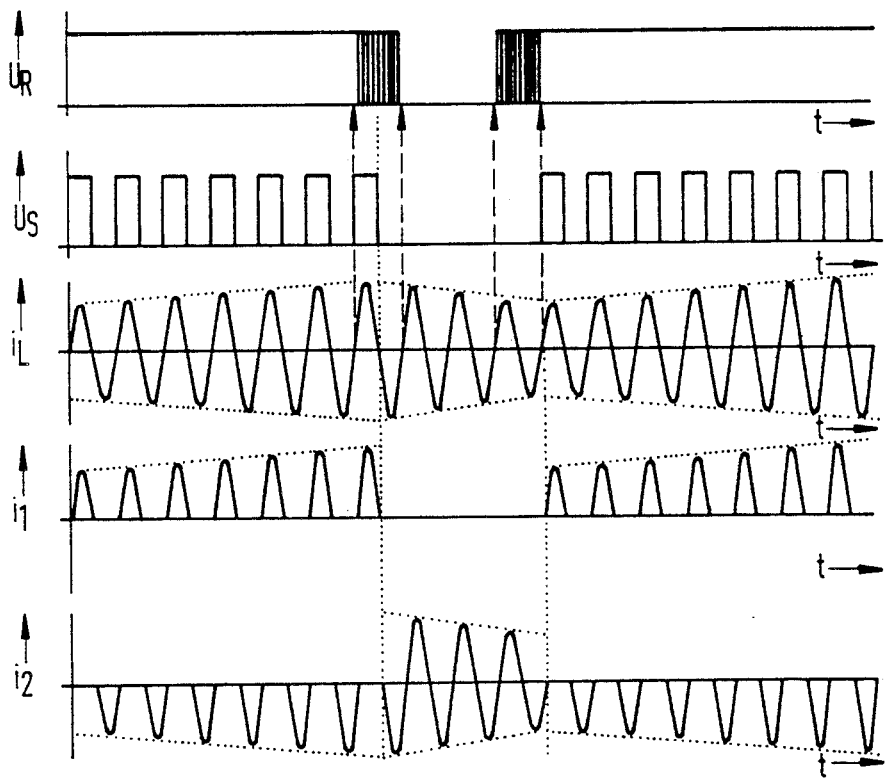

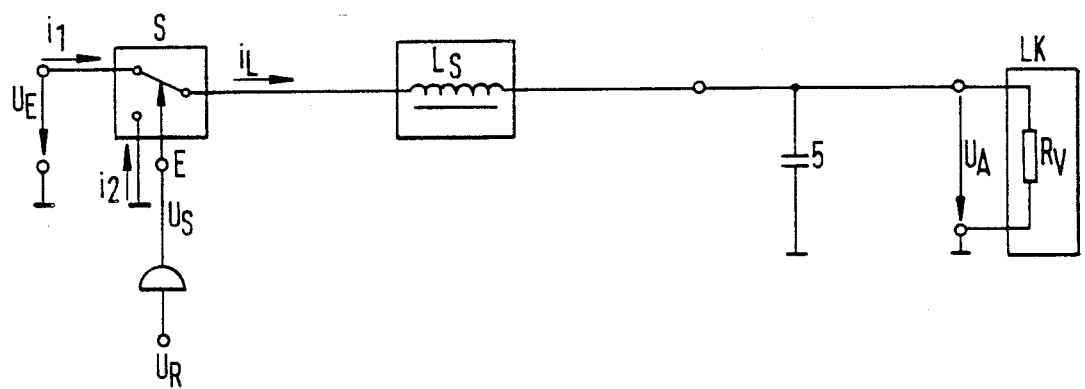
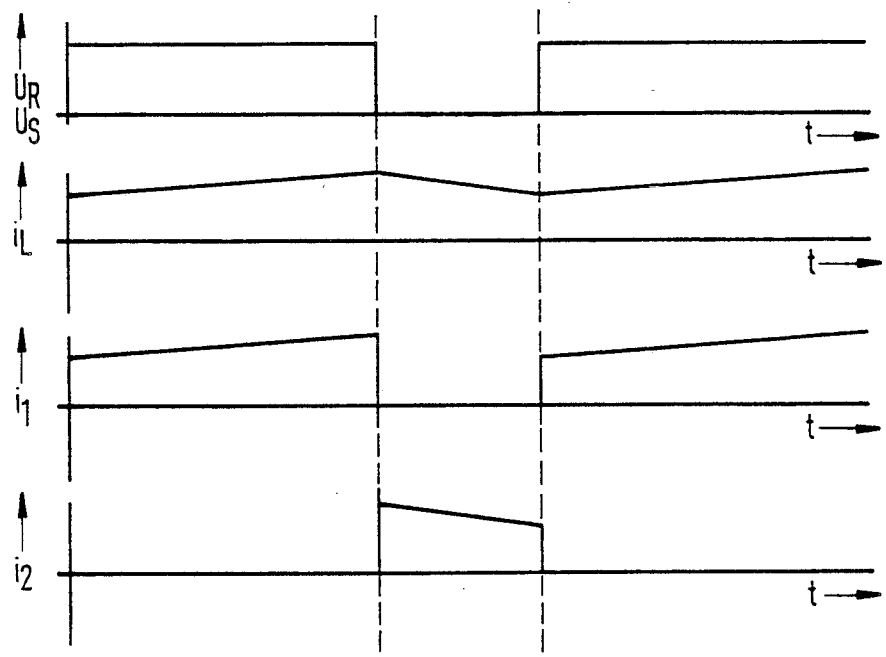
FIG.2

SELF OSCILLATING POWER STAGE FOR INVERTED RECTIFIER POWER SUPPLY

This invention concerns inverted rectifier power supplies making use of a self oscillating power stage of the rapid switching type, and more particularly such inverted rectifiers which utilize electronic means for switching an input of the inverted rectifier alternately to two different substantially constant potentials, wherein at the output of the inverted rectifier a load circuit is connected.

It is possible by means of switching type inverted rectifiers to obtain an a.c. power at low loss, from an existing d.c. voltage source of a given output voltage. Known applications of such equipment are: suppling a load with a.c. power, often making use of the possibility of transforming the a.c. output voltage and current of the inverted rectifier power stage by means of a transformer within the load circuit and with possibility of regulating the output power, voltage and current by adding a control circuit to the power stage. The main application, however, is the generation of a.c. power for a load circuit including a rectifier. In this way an inverted rectifier power stage is a main part of every d.c. to d.c. voltage converter of the rapid switching type, normally called switching rectifiers. In this case often a transformer in the load circuit and a control circuit in the power stage are included. A remarkable property of the inverted rectifier with the rectifier circuit in the load circuit is the electronic controllability of the d.c. voltage at the load. All regulation and control tasks which are possible with the regulation of a d.c. voltage can be carried out with switching regulators. An example is the regulation of the output power of a high-frequency generator by means of the regulation of the operating d.c. voltage of the final-stage amplifier of the high-frequency generator.

An overview of the recently known switching regulators has been published in "Halbleiter-Schaultungstechnik" ("Semiconductor Switching Technology") by Tietze-Schenk (7th ed., 1985, Springer-Verlag, Heidelberg), pages 539 ff. All the known switching regulators have in common the use of a so-called storage choke, i.e. a storage inductance in a circuit where it simply operates as a choke inductance. In such cases use is made of the behavior of an inductance whereby the current $i_L$ flowing therethrough is steady, but the voltage $u_L$ across the inductance can vary and even jump.

In the various embodiments of the known switching regulator the energy storing choke is switched by means of electronic switches in a different way between two different d.c. voltages or back and forth between input circuit and load circuit. In this way a rectangular wave appears across the storage choke and a triangular wave of rather alternately, approximately linear rise and an approximately linear decline of current flows through the choke. A certain magnetic energy is continuously stored in the storage choke, a fact from which the name storage choke is derived. During the phases with rising current this energy rises and in the phases with declining current the stored energy also declines. The current, however, flows continuously through the load circuit. In order to obtain the smallest possible voltage fluctuation there a charging capacitor is connected in parallel to the load circuit, which actually is a circuit branch in series with the switched power supply circuit.

The switching of the current in the storage choke is generally designated as "pulsing" and takes place at relatively high frequencies, thus for example at about 10 kHz. As a result of these high frequencies the charging capacitor may have a relatively small capacitance. With suitable control of the time course of pulsing it is possible to obtain the result that the average current through the storage choke corresponds exactly to the current which the load circuit branch should accept. Since the current accepted by the load circuit branch and the voltage across the load circuit branch are correlated by the load resistance, more generally by the load impedance, the above-described conditions and procedures amount to regulation of the output voltage.

There is a basic difference between "primarily pulsed" and "secondarily pulsed" switching regulators. In the case of secondarily pulsed switching regulators the d.c. voltage to be produced is generated directly from an already present d.c. voltage. In this case, however, various circuit modifications are used according to whether the d.c. voltage to be produced is smaller or greater than the already available d.c. voltage and likewise according to whether both voltages should or should not have the same polarity.

In the case of primarily pulsed switching regulators the storage choke is constituted as a transformer, of which the primary winding is either unsymmetrical or else is switched back and forth by electronic switches between voltages of different value (potential). In the case of the primarily pulsed switching regulators a distinction is made between blocking and through-flow converters, according to whether the energy accumulation phase of the storage choke (through-flow converter) or the energy outflow phase of the storage choke (blocking converter) is present when current flows in the secondary circuit of the transformer. Since the transformer cannot pass any direct current, an alternating voltage is produced at the secondary side of the transformer, which then must be converted into d.c. voltage by a suitable rectifier. In the rectifier circuit a smoothing choke may also be brought into the circuit.

The advantages of switching regulators, in contrast with the known series regulators (with controllable elements such as transistors interposed in series) lies in their high efficiency and the possibility of magnification of the voltage and of reversing the potential. In the case of the primarily pulsed switching regulators it is possible to utilize small high-frequency transformers for changing the voltage level instead of the 50 Hz power supply transformers which would have to be used for bringing the above-mentioned available d.c. voltage to the proper level.

All known switching regulators, however, have a basic problem. In every switching event the full amount of the current flowing through the storage choke must be switched over from one current circuit to another. In the use of electrical switches, such as bipolar transistors and field effect transistors, as well as available storage chokes or transformers having parasitic capacitances, finite switching times result, which lead to losses in the electronic switches. Since the pulsing takes place at high frequency, these switching losses result in relatively high power dissipation and lead to undesired heating of the electronic switch elements. In order to prevent the occurrence of dangerous overheating, the electronic switches and the cooling elements necessary for them must in general be overdimensioned. This leads to higher costs and to increase in weight and volume.

A further disadvantage of the secondarily pulsed switching regulators is the fact that choices must be made between various circuit modifications if either a voltage reduction or a voltage increase is necessary, or if the polarity of the d.c. voltage to be generated needs to be reversed.

SUMMARY OF THE INVENTION

It is accordingly an object of the present invention to provide a self-oscillating power stage for an inverted rectifier which avoids the above-described disadvantages also if this power stage is applied in a dc-to-dc voltage converter.

Briefly, the series-resonant circuit serves as energy storage means and is interposed in circuit between the electronic switch and the load circuit path. This is a departure from the present state of the art: Instead of a storage choke a series-resonant circuit is used for energy storage. Phase detector means are connected to said resonant circuit for detecting the phase states of the current ($i_L$) in this resonant circuit in order to deliver switching flanks ($u_P$) synchronously with this phase status. This can be achieved by example in the simple way that in the current circuit of the series-resonant circuit a current converter is connected, at the output of which a first voltage is made available which is as much as possible in phase with the current flowing through the series-resonant circuit. This first voltage is fed back to an input of the electronic switch through pulse-shaping stages, so that current feedback results producing a rectangular wave in the second voltage having switching flanks derived from the first voltage. This feedback is so set in phase that the electronic switch connects the series-resonant circuit with the higher, i.e. more positive, of the two potentials between which it alternates, when the instantaneous current into the series resonant circuit flows in the direction from the electronic switch towards the series resonant circuit. Similarly the electronic switch connects the series-resonant circuit with a d.c. voltage of the lower, i.e. more negative, potential when the instantaneous current in the series-resonant circuit flows in the direction from the series resonant circuit to the electronic switch. Self-excitation of the self oscillating, power stage for the inverted rectifier thus established provides that this stage approximately oscillates at the effective resonance frequency of the series-resonant circuit. The switch connects and disconnects the series-resonant circuit to or from each d.c. source only at null transits of the current in the resonant circuit.

In the type of operation just described, the energy storage element (the series-resonant circuit) intermediately stores not only magnetic energy as in the case of the storage choke, but both magnetic and electric energy.

For regulation of the inverted rectifier, an electronic combining circuit may be advantageously interposed ahead of the input of the electronic switch, by which the connection of the resonant circuit to energizing d.c. voltage can be intermittently interrupted for an integral number of half cycles of the resonant frequency. The electronic switching circuit is a two-state device and its particular binary state may be feedback controlled by a regulating voltage which may be derived, for example, as shown in FIG. 10.

Since a high-frequency alternating current flows in the energy storage element of the inverted rectifier, the load connected to the inverted rectifier must have a certain minimum conductivity for currents flowing during the positive and negative half sine-wave of the invention. In the case of a dc-to-dc converter the rectifier applied in the load is advantageously a full-wave rectifier circuit interposed in the circuit between the series-resonant circuit and a charging capacitor that is connected in parallel with the load circuit path.

The advantage of the invention lies in the fact that a pulsing frequency is produced automatically by the described feedback which is exactly in accord with the effective resonance frequency of the series-resonant circuit which is the energy storage element. The rectangular wave having steep switching flanks for the electronic switch which is obtained from the current flow in the energy storage element reverses exactly when the current is a null transition, i.e. when the electronic switch is passing no current. By this choice of the switching instants extremely low switching losses result.

A further advantage is that the series-resonant circuit passes the current flow in the form of an approximately sinusoidal wave. This also reduces the power losses in the diodes of the full-wave rectifier and in the charging capacitor normally part of the rectifier means.

Several possibilities are found for implementation of the electronic switch utilized in the practice of this invention. In a first embodiment the electronic switch is constituted as a complementary circuit of two transistors as switching means, i.e. either two bipolar transistors or two field effect transistors of different operating voltage polarity. These embodiments are to be selected if transistor types of the same power rating and of opposite operating voltage polarity are available.

In another embodiment of the invention, the electronic switch is constituted as a quasi-complementary circuit of two transistors as switching elements, i.e. either two bipolar transistors or two field effect transistors of the same operating voltage polarity. These embodiments are to be selected if two transistor types of different operating voltage polarity and identical power rating are not available.

The electronic combining circuit which is connected ahead of the control input of the electronic switch serves for regulating the output power of the inverted rectifier by interruption of the feedback. When the feedback is switched through, oscillation rises up to a certain value in amplitude in the series-resonant circuit and when the feedback is interrupted, the oscillation falls off again (attenuates). For the condition of interruption of the feedback several implementations of the electronic combining circuit may be chosen. In a first embodiment the interruption of the feedback blocks the electronic combining circuit in a quiescent state in which the electronic switch remains connected with the lower of the two available d.c. potentials. In this case it is recommended to provide a freewheeling diode interposed between this d.c. voltage connection and the input of the series-resonant circuit, with such polarity of the diode that the switching power stage is blocked in the quiescent condition. Since the known elements for constructing an electronic switch can conduct current in only one direction, the flow of current in the opposite direction when the oscillation is falling off in the series-resonant circuit is led through this freewheeling diode.

In another implementation of the invention, the interruption of the feedback circuit signal blocks the electronic combining circuit in a quiescent condition such that the electronic switch remains in contact with the higher potential d.c. voltage. In this case it is desirable to connect a freewheeling diode from this d.c. voltage connection to the input of the series-resonant circuit in such a way that this freewheeling diode is in its blocking condition during the quiescent state of the switching power stage. In this way the same effect is obtained as in the previous instance.

In a further embodiment of the invention, the interruption of the feedback signal locks the electronic combining circuit into a quiescent state such that the electronic switch remains open, i.e. is not in contact either with the lower or with the higher potential d.c. source. In this case two freewheeling diodes are provided, connected to the input side of the series-resonant circuit and respectively to the two d.c. potentials in such a way that these freewheeling diodes are both blocked in the quiescent condition of the switching regulator.

The manner in which the correlation circuit switches back and forth between the state "feedback switched through" and the state "feedback interrupted" has an important influence on the switch-over losses in the switching elements of the electronic switch. The switch-over losses are least when switching over takes place at a moment of zero current. Since the current in the series-resonant circuit periodically passes through zero at the frequency of oscillation of the series-resonant circuit, the switch-over between the states "feedback switched through" and "feedback interrupted" are best performed only during the null transits of the current in the series-resonant circuit. For this purpose an embodiment of the correlation circuit is available which is so constituted that the interruption or switching through of the feedback circuit does not take place at once when the regulating voltage reverses, but only at the next reversal of the feedback voltage, i.e. at the next null transit of the current of the series-resonant circuit.

In many practical cases it is necessary to produce a current, voltage or impedance match to produce a potential reversal between the electronic switch and the load circuit path. In such cases it is recommended to interpose a transformer between the series-resonant circuit and the full-wave rectifier circuit. Since a high-frequency alternating current flows in the series-resonant circuit which is the storage element of the regulator, the transformer can very easily provide the desired matching or potential reversal. The special advantage thus available, compared to the prior art, is the fact that the transformer can be designed for operation with a purely sinusoidal current at a fixed frequency and can thus be a narrow-band device.

In a further development of the invention, the switching regulator may serve to feed several load circuit paths, each of which is connected with an individual secondary winding of the transformer through an individual full-wave rectifier and equipped with an individual charging capacitor. By the use of the transformer, therefore, these various load circuit paths can be supplied simultaneously.

Several circuit variations are known and are useful for the full-wave rectifier circuit. In one embodiment the full-wave rectifier circuit is constituted as a bridge rectifier.

In many particular applications voltages symmetrical to each other need to be delivered by a single power supply energized by the commercial power mains. An example of such a case are power supplies for operational amplifiers that require operating voltages of $+15$ and $-15$ volts, or for high-fidelity amplifiers having power amplifiers using power transistors in complementary circuits. For such cases a switching regulator according to the invention is recommended in which two load circuit paths are provided, with the full-wave rectifier circuit so constituted that one diode is connected between the series-resonant circuit and the charging capacitor of one load circuit path with one particular polarity and the second diode is connected between the series-resonant circuit and the charging capacitor of the second load circuit path with the opposite polarity. In this way output voltages of opposite polarity are produced respectively in the first and second load circuit paths.

The above-described arrangement can be provided in an equivalent fashion by a regulated inverted rectifier equipped with a transformer. In this case it is recommended for the transformer to have at least two secondary windings in which the individual load circuit paths with their respective charging capacitors in parallel are so connected to half-wave rectifiers that for every half wave of the current that flows in the series-resonant circuit, a corresponding current flow in at least one of the half-wave rectifiers and into the corresponding charging capacitor. In that way there is established for the current that flows in the series-resonant circuit, by virtue of the transformer, an equivalent of a full-wave rectifier effect. The advantage of such an arrangement lies in the fact that at the same time several output voltages of different magnitudes and different polarity can be provided. It needs only to be assured that for each of the two current directions in the series-resonant circuit a corresponding current flow in at least one of the secondary windings, so that the high-frequency oscillation in the series-resonant circuit is not attenuated by a high ohmic resistance so that no more oscillation can be built up.

The above-described measures relating to half-wave and full-wave rectifier circuits connected to the secondary windings of the transformer can also be combined with each other. Thus it can be further proposed that the transformer should be equipped with several secondary windings to which load circuit paths, each with its own full-wave rectifier circuit and its own charging capacitor, can be combined with the presence of additional paired load circuit paths each having a half-wave rectifier of its own and a charging capacitor of its own.

In the embodiments described up to now it was assumed that both the current converter, as well as the pulse-shaping stages, the correlation circuit and the electronic switch operate in an ideal fashion, i.e. without time delay. In practice it must be recognized, however, that these assumptions are not always fulfilled with sufficient accuracy or approximation. All of the elements described above produce slight time delays or phase shifts. The switch-over losses in the electronic switch are only at their very least when the switching-over takes place exactly in the null transition of the current that flows in the series-resonant circuit. In order to fulfill this condition as well as possible, it is recommended to interpose a phase shifter between the current converter and the control input of the electronic switch and to set the phase of the control signal with it so that the switching-over of the electronic switch always takes place as accurately as possible during the null transits of the current in the series-resonant circuit.

The advantages of a switching regulator according to the invention lie in the fact that the electronic switch elements switch over in the current-free state. This condition can naturally be maintained only if the current in the series-resonant circuit does not change so rapidly that already during the switching operation it again takes on substantial magnitudes. This can be influenced by the resonance frequency of the series-resonant circuit. The inventors accordingly recommend that the elements of the series-resonant circuit should be so dimensioned that the resonance frequency of the series-resonant circuit provides a period duration which is longer by one order of magnitude, i.e. at least by a factor of 10, then the switching time of the elements used in the electronic switch. In that way it is assured that the electronic switch will remain sufficiently free of current during the entire switching operation. The inventors have discovered in practical experiments that at the present time switching regulators with this dimensioning can be made for powers of up to about 1 kW with resonant frequencies of the series-resonant circuit up to about 1 MHz.

BRIEF DESCRIPTION OF THE DRAWINGS

The invention is further described by way of illustrative example with reference to the annexed drawings, in which:

FIG. 1 is a basic circuit diagram of a regulated inverted rectifier according to the invention and diagrams of individual voltages and currents of the circuit drawn to the same time scale;

FIG. 2 is a basic circuit diagram of a regulated inverted rectifier of the prior art and diagrams of voltages and currents in the circuit drawn to the same time scale;

DESCRIPTION OF THE ILLUSTRATED EMBODIMENTS

Figure 3:
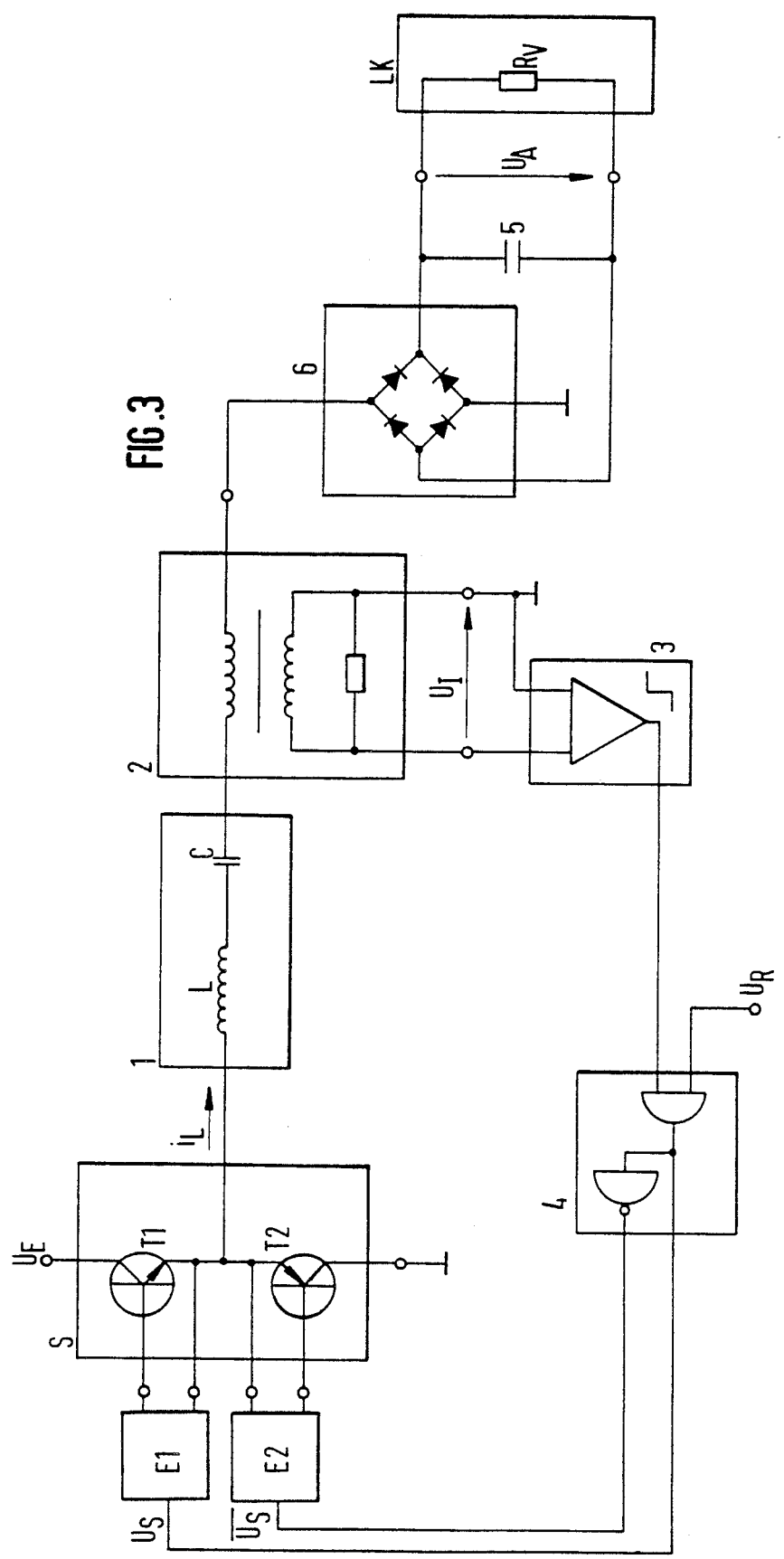
FIG. 3 is a basic circuit diagram of a regulated inverted rectifier having a complementary stage for the electronic switch.

FIG. 1 shows a basic circuit diagram of a regulated inverted rectifier according to the invention, while FIGS. 1a-1e are the time course of individual voltages and currents. S is the electronic switch which can switch the series-resonant circuit 1, consisting of L and C, back and forth between two voltages of different value (potential). For simplification of visual presentation, this and the following examples relate to the special case in which one of the potentials is zero. The two potentials therefore represented respectively by the input voltage $U_E$ and the null voltage designated by the grounding symbol.

In series with the series-resonant circuit 1 is a current converter 2, at the output of which a voltage $u_I$ is produced which is as nearly as possible in phase with the current $i_L$ flowing in the series-resonant circuit 1. This voltage $u_I$ is transmitted through the pulse-shaping stages 3 and the correlation circuit 4 to the control input E of the electronic switch. The regulation voltage $u_R$ is provided at a second input of the correlation circuit 4 which controls the switched-through state for the feedback.

The load circuit path LK here consists, by way of substitution, of the consumer resistance Rv which lies in parallel to the charging capacitor 5. The full-wave rectifier 6 is connected between the series-resonant circuit 1 and the charging capacitor 5. As a result of the operation of the foregoing components the output d.c. voltage $U_A$ appears in the load circuit path LK.

FIGS. 1a-1e show the time course of the regulation reference voltage $u_R$, of the control voltage $u_S$ of the electronic switch, of the current $i_L$ flowing in the series-resonant circuit and of the currents $i_1$ and $i_2$ respectively flowing to the d.c. voltage sources having differential potential.

Figure 10:
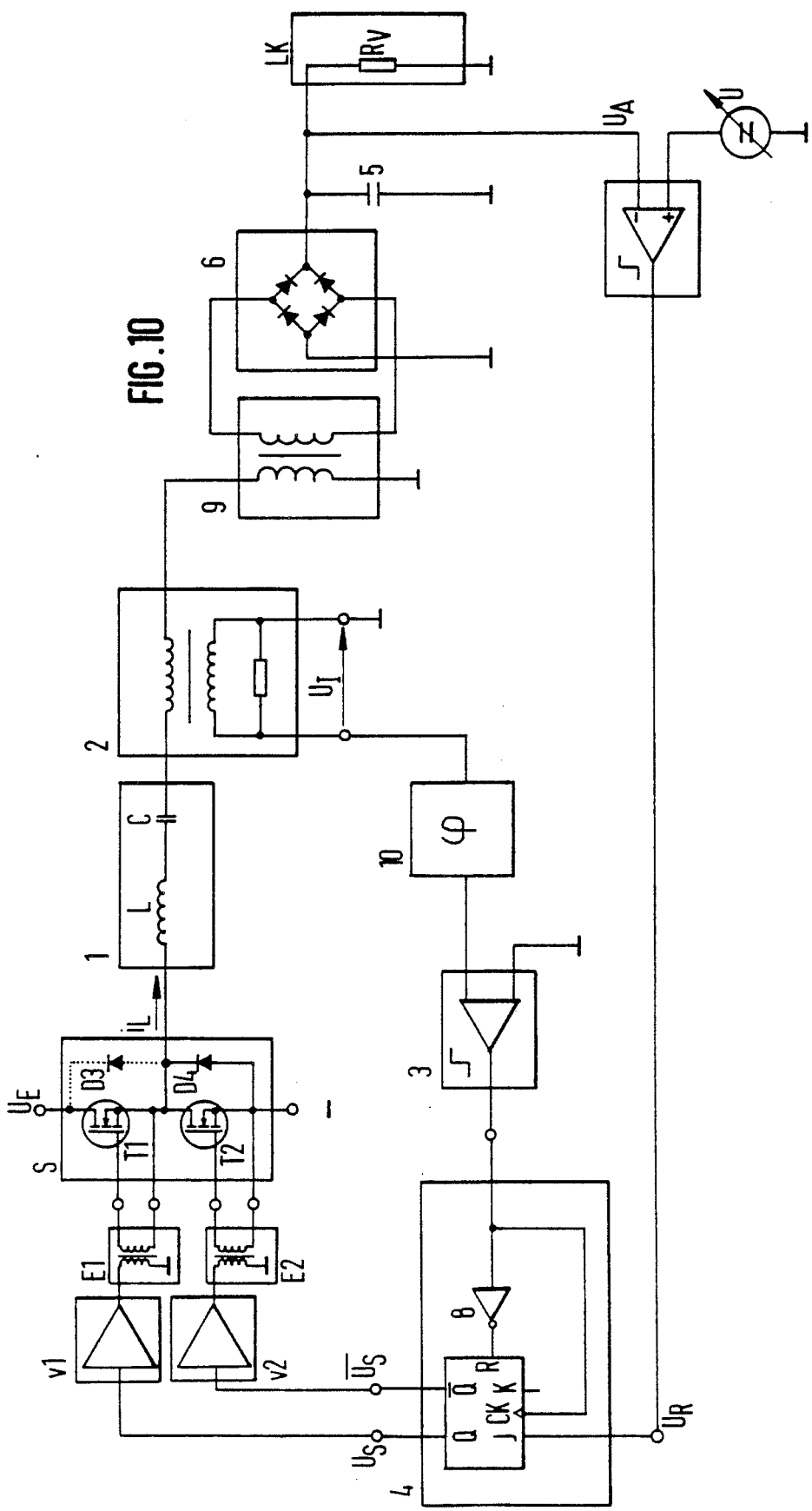
FIG. 10 is a basic circuit diagram of a regulated inverted rectifier equipped with a phase shifter for fine adjustment of the switching instants and showing the derivation of a regulating voltage.

In the case of the regulation voltage $u_R$ a random variation between two values is shown. As will be shown below, the regulation voltage can take on two relevant values. These two values permit the switching regulator respectively to raise and to lower the output voltage $U_A$. If the output voltage $U_A$ is to be raised, then the regulation voltage $u_R$ will have a value at which the correlation circuit 4 switches the feedback through to the control input of the electronic switch. If on the other hand the output voltage $U_A$ should be lowered, the regulation voltage $U_R$ should have a value at which the correlation circuit 4 should interrupt the feedback. In this way the switching regulator can hold constant the output voltage $U_A$ in a manner of a two point regulator and can regulate it with reference to a guide voltage as shown in FIG. 10.

In FIG. 1 it is assumed that the correlation circuit 4 switches the feedback through to the switch control when the regulation voltage $u_R$ exceeds a certain threshold value and interrupts the feedback when the regulation voltage $u_R$ lies below the threshold value, for example zero. So long as the feedback is switch through, the electronic switch 1 is switched back and forth between the two d.c. voltages by the control voltage $u_S$. As shown in FIG. 1, the timing is such that the electronic switch S switches to the d.c. voltage with the higher (more positive) potential when the current $i_L$ flows with a positive instantaneous value from the electronic switch S into the series-resonant circuit 1, and switches to the d.c. voltage with the lower (more negative) potential when the current $i_L$ has a negative instantaneous value as seen from the electronic switch S. Since this is a positive feedback, and therefore equal to an undamping of the series-resonant circuit, the amplitude of the oscillation of the current $i_L$ increases. This increase of oscillation has basically an exponential course. With a high Q of the resonant circuit elements L and C and low alternating current losses of the charging capacitor 5, however, the assumption that current amplitudes which occur in practice have an approximately linear rise is a good starting point.

During an increasing oscillation, in the here selected polarity, each positive half-wave of the current $i_L$ flows from the available d.c. current source $U_E$ through the series-resonant circuit 1, the current converter 2 and the full-wave rectifier 6 into the charging capacitor 5. Each negative half-wave flows from the ground connection of the d.c. source, through the series-resonant circuit 1, the current converter 2 and the full-wave rectifier 6 and into the charging capacitor 5 with the same polarity as in the case of the positive half-wave. In FIGS. 1c, 1d and 1e the respective courses of the currents $i_L$, $i_1$ and $i_2$ can be followed in their relation with the regulation voltage $u_R$ and the control voltage $u_S$.

If for example the regulation voltage in FIG. 1a goes to zero, collection circuit 4 interrupts the feedback. In this example it is assumed that the electronic switch S is locked in the position in which the series-resonant circuit 1 is switched through to the d.c. voltage with the lower potential, in this case, therefore, to the ground connection of the d.c. source $U_E$. The entire current $i_L$ now flows as the current $i_2$ is ground. Now the series-resonant circuit 1 cannot be supplied with any more energy from the available d.c. source. Since each half-wave of the current $i_L$ flows on through the full-wave rectifier 6, so that the charging capacitor 6 is charged, energy is drawn out of the series-resonant circuit and the current amplitude falls. This amplitude decline also has an exponential course, but again may be assumed to be approximately linear by the above-mentioned assumptions for the region of interest.

It is easy to see that with a suitable time course of the regulating voltage $u_R$ an average amplitude will be set by the alternately rising and falling amplitude of the current $i_L$ such that the charging capacitor 5 will be supplied with as much charge as the load circuit path uses up at the desired voltage $U_A$. Regulation of the voltage $U_A$ is thereby possible with the time course of the regulating voltage $u_R$. Although this involves in principle a two-point regulation, with sufficiently short intervals of the regulating voltage the desired smoothing of the output voltage $U_A$ can be obtained by means of the charging capacitor 5.

FIG. 2 now shows the difference between a regulated inverted rectifier according to the invention and a switching regulator according to the prior art. In a switching regulator according to the prior art the storage choke $L_s$ is used as the energy storage element. An electronic switch S switches the input of the storage choke $L_s$ alternately to two d.c. voltages of different potential, of which one, as in FIG. 1, the potential could also be zero. The current flowing in the storage choke $L_s$ is supplied through to the parallel circuit of the load circuit path LK and the charging capacitor 5. By means of the control voltage $u_R$ the input of the storage choke $L_s$ is applied to the d.c. voltage with the higher potential when the voltage in the load circuit path is to be raised and to the d.c. voltage with the lower potential when the voltage in the d.c. path needs to be lowered. This regulation also operates according to the principle of a two-point regulator. The electronic switch must here always switch the entire current of the storage choke $L_s$ which leads to high switching losses in the case of non-ideal switches. Corresponding courses of current are shown in FIGS. 2b, 2c and 2d. They correspond in principle to the course of amplitude of the currents in a switching regulator according to the invention.

The advantage of the switching regulator according to the invention therefore lies in that no d.c. current flows in the storage element which needs to be switched, but instead an alternating current. Because of the properties of the storage element, namely the series-resonant circuit, the current in the storage element goes periodically through zero at high frequency. When these null transitions of the current are used as switching instants, as recommended in the case of the present invention, the switch-over losses of the available electronic switches are drastically reduced compared to the situation of the prior art.

FIG. 3 shows an embodiment of the electronic switch utilizing a complementary stage built around two bipolar transistors T1 and T2 of different operating voltage polarity, i.e. an npn transistor T1 and a pnp transistor T2. The two transistors must be turned on in opposite phase in order to obtain the described switching procedure for the storage element. For this reason the correlation circuit 4 contains an inverter 24 which generates, from the control voltage for one of the transistors, a negated voltage or inverse voltage as a control voltage for the other transistor. E1 and E2 are input stages for the transistors which may contain driver amplifiers and elements for d.c. potential separation.

Of course instead of the bipolar transistors T1 and T2, field effect transistors having different operating voltage polarity could be used in FIG. 3, for example one n-channel FET and one p-channel FET.

Figure 4:
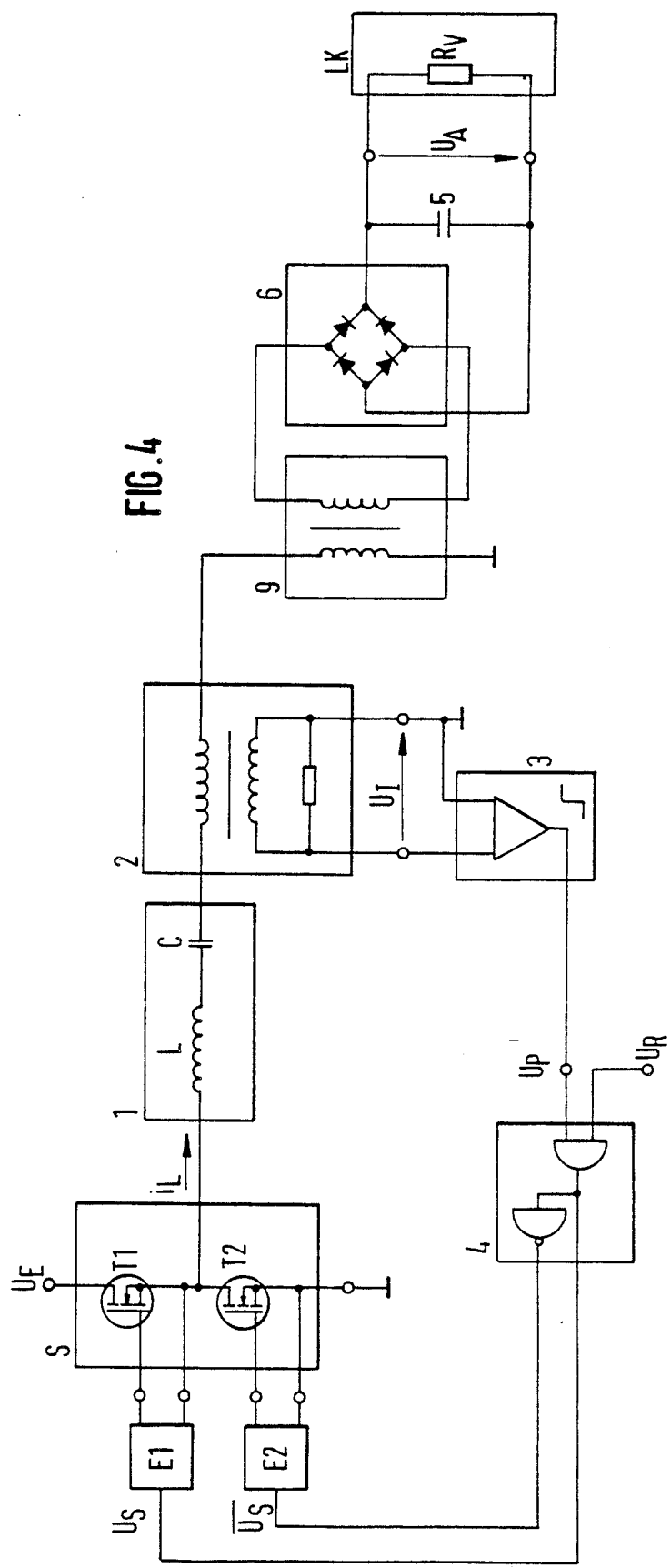
FIG. 4 is a basic diagram of a regulated inverted rectifier having a quasi-complementary stage for the electronic switch and a transformer for matching the load.

In FIG. 4, on the other hand, the embodiment of the electronic switch there shown has a quasi-complementary stage utilizing two field effect transistors T1 and T2 having the same operating voltage polarity are used. In this example, n-channel locking layer FETs are used as switching elements. The two transistors T1 and T2 must now again be turned on in opposite phase in order to obtain the described switching procedure for the energy storage element. For this reason, the correlation circuit 4 also in this case includes an inverter 24 which produces from the control voltage for one transistor the negated or inverted voltage necessary as the control voltage for the other transistor. Of course bipolar transistors with the same operating voltage polarity, thus two npn or two pnp transistors, could be used in this circuit.

The smallest possible switch-over losses in the elements of the electronic switch can be obtained when the switch-overs occur exclusively in the null transistors of the current. It is therefore particularly advantageous to avoid activating the electronic switch at once when the regulation voltage $u_R$ jumps from one level to another and to wait until the next null transition of the current for activation of the switch. Because of the high frequency of the current $i_L$ in the series resonance circuit, the time delay which is introduced by this precaution with reference to the pulsing times of the regulation voltage can be limited to as little as desired. Account must also be taken of the switching time of the elements T1 and T2 (FIGS. 3, 4, 6, 7 and 10). This means that the oscillation period of the series resonant circuit should have a duration which is at least 10 times as great as the switching time of the switch elements T1 and T2.

In FIG. 1a the appropriate time intervals for switching are marked in the course of the regulating voltage $u_R$ for coincidence of the switching instant of the electronic switch with the transitions of the regulating voltage. The marking is by vertical shading which is intended to symbolize the various switching flanks. The relation to the course of the current $i_L$ is shown by the broken lines and arrowheads.

Figure 5:
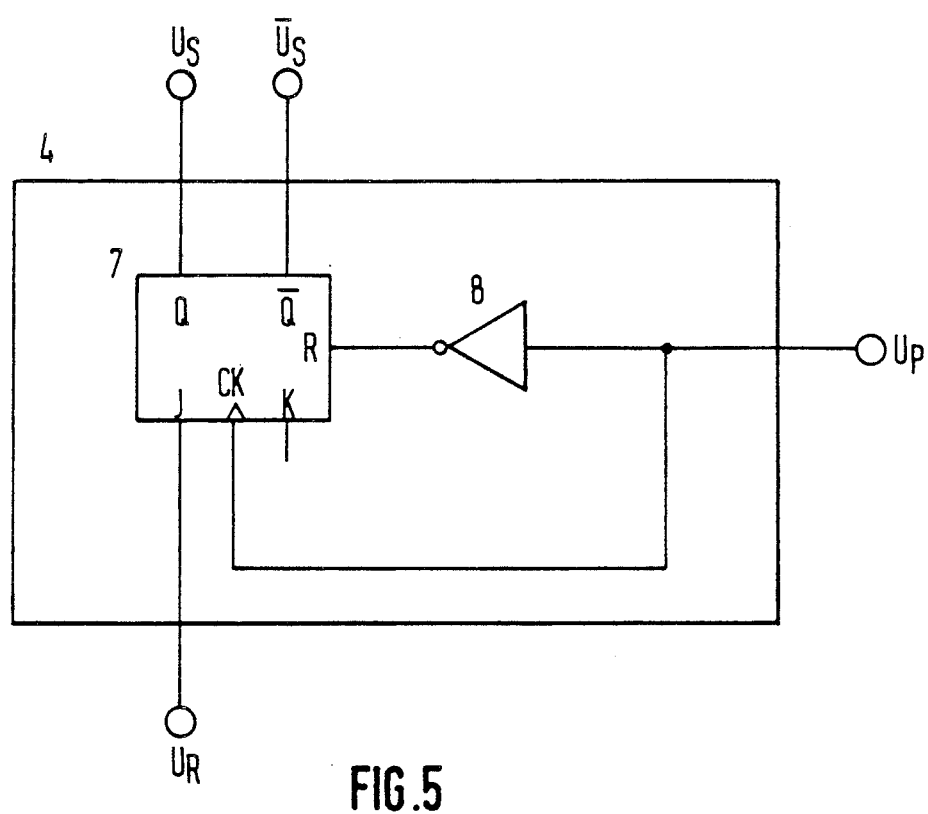
FIG. 5 is a basic circuit diagram of a correlation circuit for use in an inverted rectifier of the invention.

A correlation circuit that satisfies the above-described conditions is shown in FIG. 5. The circuit contains a JK flipflop 7, at the J input of which the future event is merely prepared by the regulating voltage $u_R$. The flipflop 7 can switch only when the regulating voltage $u_R$ corresponds to a logic "1", which signifies a need for a switching-through of the feedback circuit. So long as the regulating voltage is "1", the flipflop 7 will be set by the clock input CK at any positive null transition of the current $i_L$ by the output voltage $u_p$ of the pulse-shaping stages 3. The electronic switch S is then switched by the control voltage $u_S$ to the more positive d.c. voltage. At every negative null transition of the current $i_L$ the flipflop 7 is reset by the inverter 8, and the electronic switch S is switched by the control voltage $u_S$ to the more negative voltage. With such a circuit no supplementary inverter for obtaining the negated control voltage is used, because a JK flipflop already has an output $\overline{Q}$ for the inverse of the noninverted output Q.

If the regulating voltage $u_R$ jumps during a half-wave to "0", thereby setting the flipflop 7, the flipflop remains set until the next negative null transition of the current $i_L$ and the electronic switch switches, again, only at this null transition. If the regulating voltage jumps to "0" during a half-wave, thereby resetting the flipflop 7, the flipflop output can no longer produce a switchover at the next positive null transition of the current $i_L$.

When the regulating voltage $u_R$ jumps from "0" to "1", the flipflop will then be set only at the next positive null transition of the current $i_L$ and the electronic switch likewise switches over only at this null transition. It is thus assured that the electronic switch S will switch over only at the null transitions of the current.

All the descriptions up to now relate to conditions under which high-frequency alternating current is already flowing in the series-resonant circuit 1. It is clear to a specialist in the art, however, that supplementary precautions must be taken in order to allow the circuit to go into oscillation when switched on. Various possibilities are available to obtain such a start-up of oscillation. A very simple possibility is to provide a single pulse or a short train or pulses to the control input E of the electronic switch 1 for oscillation start, such a single pulse or a short pulse train being derived from an auxiliary oscillator (not from the current $i_L$) with a pulse duration of approximately half the duration of one period of the resonant frequency of the series-resonant circuit 1 or, in the case of a pulse train, at a pulse repetition rate approximately corresponding to the resonance frequency of the series-resonant circuit 1. It is not necessary to go into the matter of these start-up procedures, since the choice among them is not important for the concept of the present invention.

Figure 6:
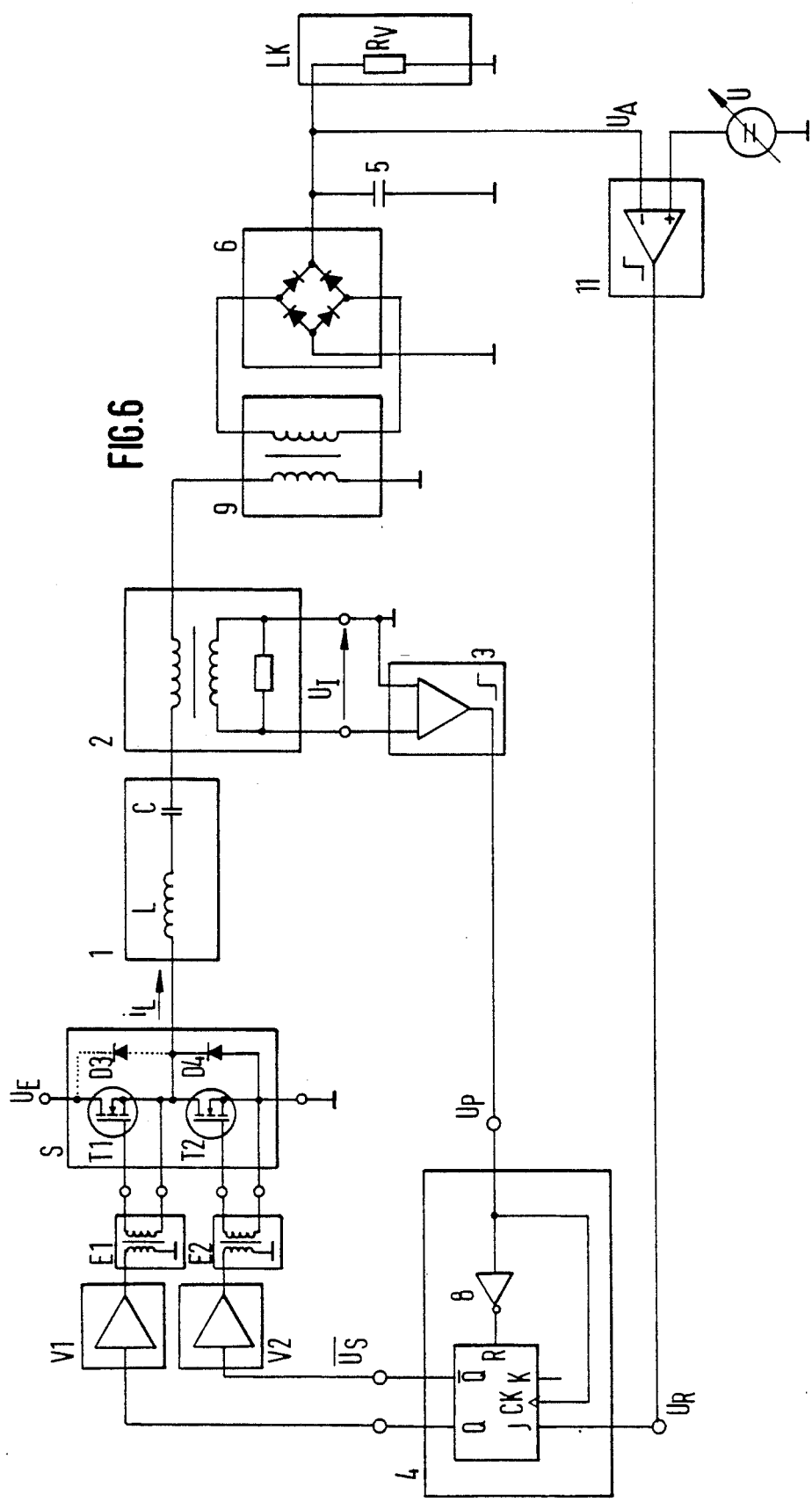
FIG. 6 is a more detailed basic circuit diagram of a regulated inverted rectifier utilizing a transformer and a rectifier for generation of a regulation voltage $u_R$.

A somewhat more elaborate basic circuit diagram of a regulated inverted rectifier according to the invention is shown in FIG. 6. In this case, a quasi-complementary circuit of two field effect transistors is used as the electronic switch. The transistors are controlled from the previously described correlation circuit, which permits a switch-over of the electronic switch only in the null transitions of the current $i_L$. The turning on of the two transistors T1 and T2 is produced by the two outputs of the flipflop 7 which are in phase opposition to each other, this being done through the driver stages V1 and B2 and through the input circuits E1 and E2, which last are shown to be simple transformers in this case. The correlation circuit 4 of this example blocks at the time when the feedback is interrupted into a state in which the electronic switch S remains connected to the lower d.c. voltage, in this example, therefore, connected to ground. During this interval the transistor T2 can accept only the negative half-waves of the current $i_L$. These flow as positive current in the transistor T2. The freewheeling diode D4 is provided for the positive half-waves and is connected from the input of the series-resonant circuit to ground. The diode's polarity is so selected that it is blocked in the quiescent state of the switching regulator. By quiescent state is to be understood as the state in which no current $i_L$ at all flows (just as is the case, for example, prior to the start of oscillation). In FIG. 6, therefore, the freewheeling diode 4 has its anode connected to ground.

The freewheeling diode D3 with dotted line connections in FIG. 6 is not necessary in this example. It is to be provided, however, if the correlation circuit 4, at the times in which the feedback is interrupted, is locked into a state such that neither the transistor T1 nor the transistor T2 remain conducting. Correspondingly, only the freewheeling diode D3 would be necessary if during these intervals the transistor T1 should remain conducting.

A transformer 9 is also provided in FIG. 6 by which a current, voltage, impedance or polarity match to the load resistance $R_v$ can be provided. This transformer is designed for a frequency that corresponds to the resonant frequency of the series-resonant circuit 1.

It is also shown in FIG. 6, by way of example how the regulating voltage $u_R$ can be obtained. In this case it is assumed that the output voltage $U_A$ of the switching regulator is to be held constant. This voltage is compared by a comparator 11 with a preselectable reference voltage $U_{sol}$. The output voltage of the comparator is logic "1" when $U_A < U_{soll}$ and logic "0", when $U_A \times U_{soll}$. It therefore fulfills the conditions necessary for use as the regulating voltage $u_R$. Naturally, the regulating voltage $u_R$ can be derived from quite different physical magnitudes in a wide variety of other applications, as for example from the output power of a high-frequency generator which is supplied with its operating voltage by this regulated inverted rectifier, so that its output power can be regulated by way of the operating voltage.

Figure 7:
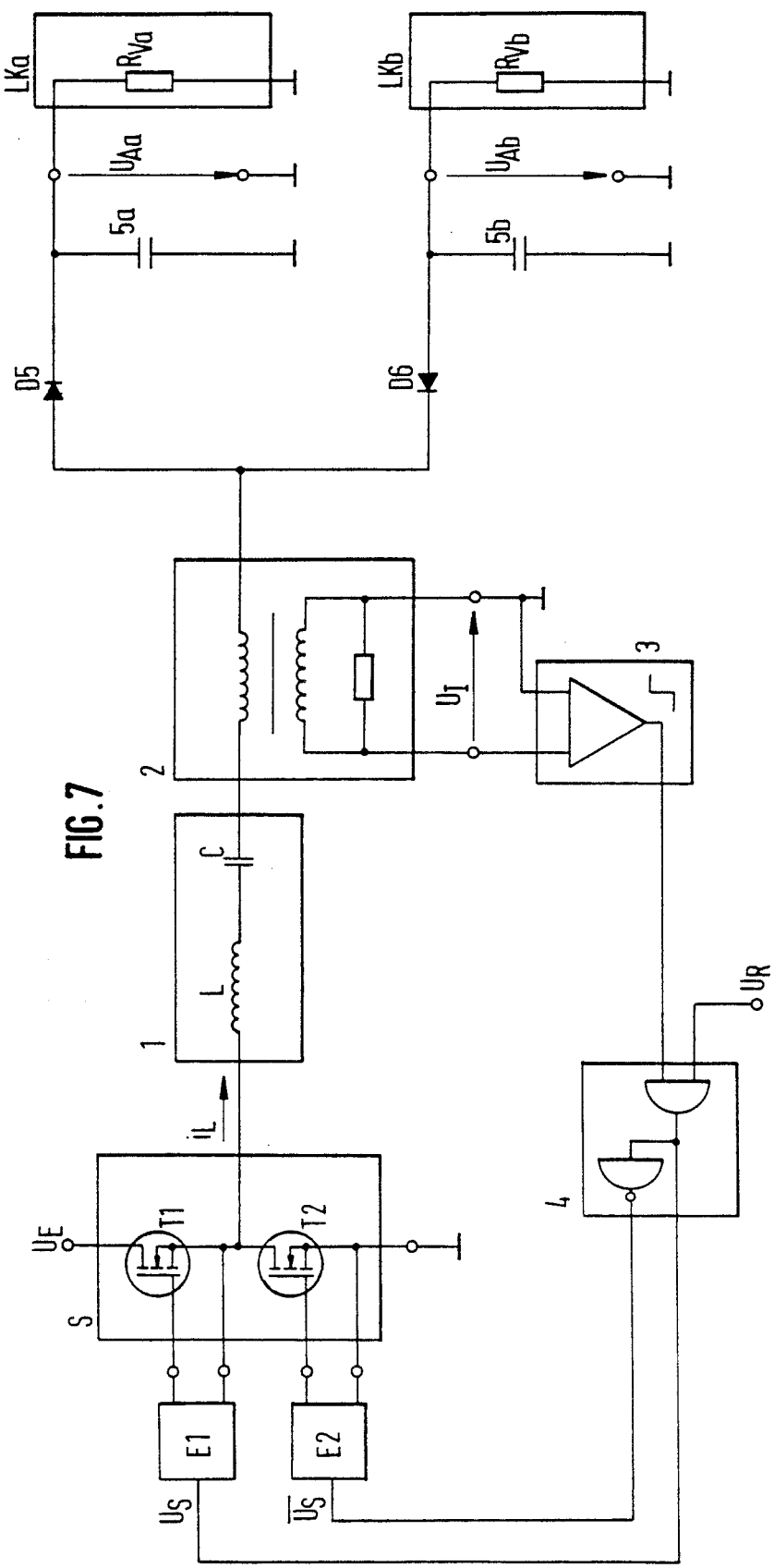
FIG. 7 is a basic circuit diagram of a regulated inverted rectifier provided with two load circuit paths and half-wave output rectifier circuits.

FIG. 7 shows an example in which two load circuit paths LKa and LKb are provided. Each load circuit path has its own half-wave rectifier D5, D6 and its own charging capacitor 5a, 5b. The two half-wave rectifiers D5, D6 are so poled that input voltages $U_{Aa}$ and $U_{Ab}$ of different polarity appear in the two load circuit paths LKa and LKb. Thus the half-waves of the current $i_L$ flow in one or another of the two half-wave rectifiers according to polarity, there is thus established an effect which is equivalent to a full-wave rectifier for the current $i_L$.

Figure 8:
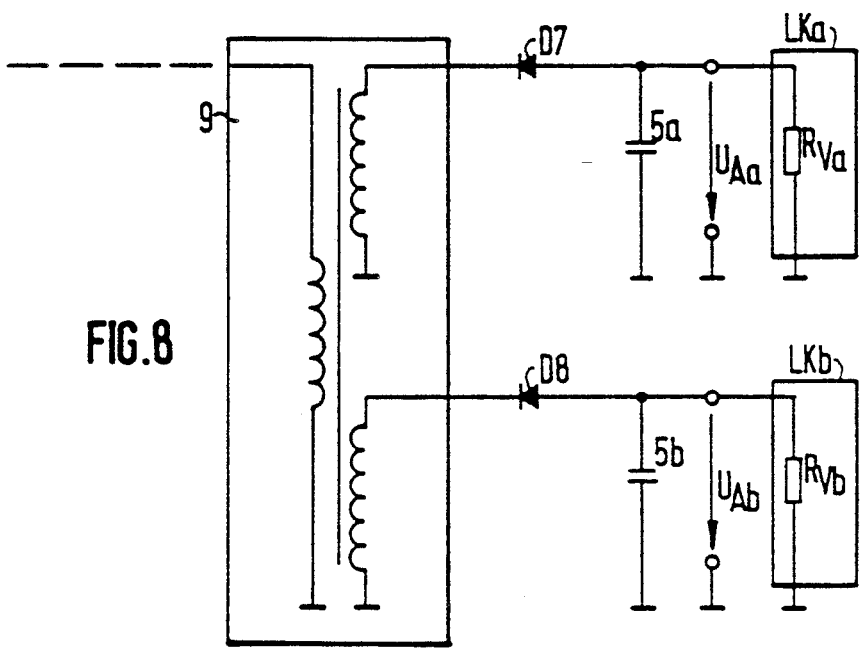
FIG. 8 is a circuit diagram showing transformer with two secondary windings, two charging capacitors and two half-wave rectifiers.

In FIG. 8 a circuit is shown having a transformer 9 for coupling two load circuit paths to the switching regulator. In the secondary side of the transformer 9 two windings are provided to each one of which a load circuit path and a charging capacitor 5a, 5b in parallel therewith are connected through a half-wave rectifier D7, D8. The winding direction of each winding is designated with a dot in the usual way. The conducting direction of the diodes is in each case so suited to the winding direction of the related secondary winding that during each half-wave of the current $i_L$ a corresponding current flows at least in one of the half-wave rectifiers D7 and D8 and to the corresponding charging capacitor 5a and 5b. Consequently both circuits together are equivalent to the circuit in FIG. 7 when account is taken of the transmission characteristics of the transformer 9. The advantage of this circuit modification is that two or more voltages of different magnitude and polarity can be obtained from a single switching regulator. It is evident that this principle can also be applied in the case of more than two secondary windings and also in combination with full-wave rectifiers at one or more secondary windings, as shown in FIG. 9.

Figure 9:
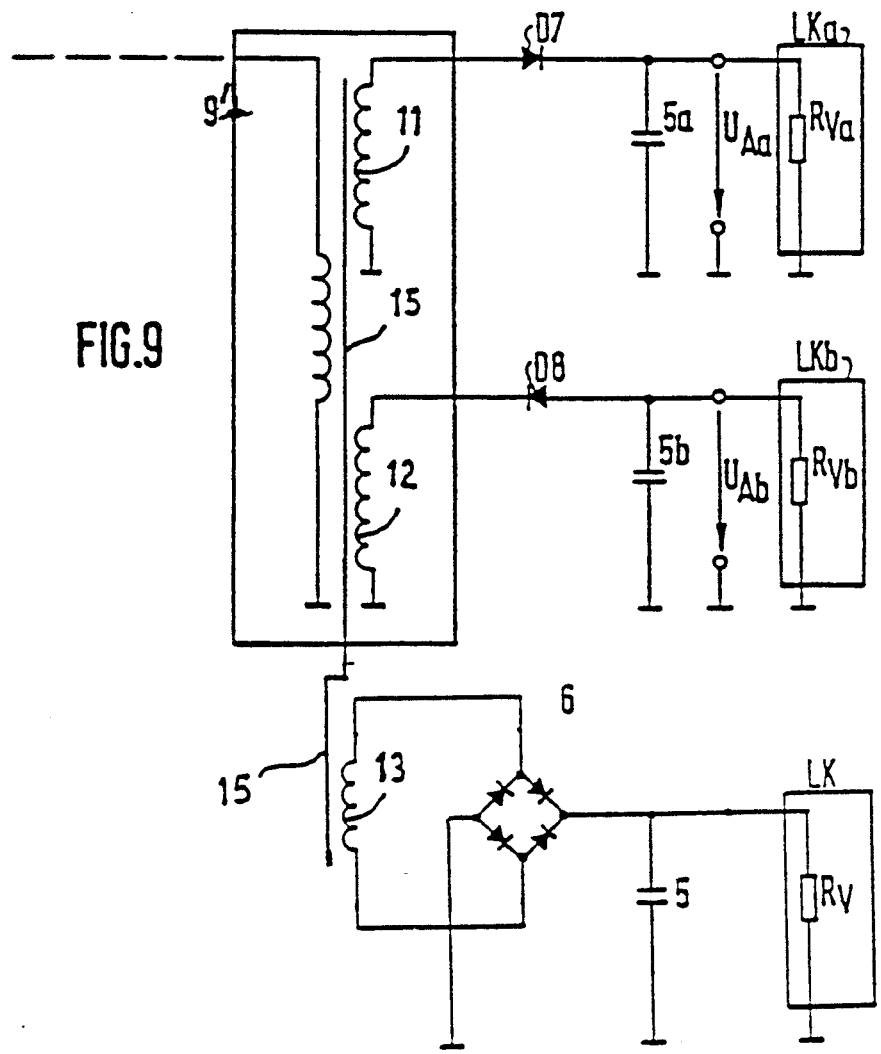
FIG. 9 is a circuit diagram showing a transformer with three secondary windings, three charging capacitors, two half-wave rectifiers and a full-wave rectifier.

FIG. 9 shows the transformer 9' corresponding to the transformer 9 of FIG. 8 but having three windings 11, 12, and 13 on the common core 15. The winding 11 is connected to a half-wave rectifier D7 and the winding 12 is connected to a half-wave rectifier D8 poled oppositely to D7, as in the case of FIG. 8. The winding 13, however, is connected to a full-wave rectifier 6, as in the case of FIG. 4.

FIG. 10 shows a regulated inverted rectifier which is provided with a phase shifter circuit 10. With this circuit 10 the phase of the feedback signal can be so adjusted that the switching events of the electronic switch can coincide in fact quite precisely with the null transitions of the current $i_L$. Propagation times in the digital components and phase errors of analog components, such as those of the current converter 2, can be compensated out by means of the phase shifter 10. Of course the phase shifter can also be substituted as a digital component and then be suitable for inserting in the pulse-shaping stages 3 or at any other place between the pulse-shaping stages 3 and the control input E of the electronic switch.

Although the invention has been described with reference to particular illustrative examples, it will be understood that modifications and variations are possible within the inventive concept.

We claim:

1. A switch-controlled regulator for a d.c.-to-d.c. voltage converter having electronic means for switching an input of the regulator alternately to two different substantially constant potentials, said electronic switching means having a control input, and a charging output capacitance connected to terminals for connection to a load circuit path, said regulator further comprising:

a series-resonant circuit energy storage means having a frequency of resonance and interposed between said electronic switching means and one of said terminals to which said charging capacitance is connected;

a current-to-voltage conversion means (2), having an output and having an input interposed in circuit in series with said series-resonant circuit energy storage means, for producing a first control voltage which is as closely as possible in phase with current flow in said series-resonant circuit means, said current-to-voltage conversion means having an output for supplying said first control voltage;

feedback circuit means, including pulse shaping means (3), an output, and an input connected to said output of said voltage-to-current conversion means (2), for deriving from said first control voltage and a second control voltage of pulse form substantially in phase with reversals of current flow in said series-resonant circuit means and supplying said second control voltage to said output of said feedback circuit means in such a way that when current ($i_L$) flows with positive instantaneous value into said series-resonant circuit means (1) from said electronic switching means (2), said second control voltage is of a value which, if connected through to said control input of said electronic switching means, would switch said electronic switching means to the more positive of said two different potentials, and when current ($i_L$) flow between said electronic switching means and said series-resonant circuit means has an instantaneous value which is negative, said second control voltage is of a value which, if connected through to said control input of said electronic switching means, would switch said electronic switching means to the more negative of said two different potentials;

an electronic combining circuit (4), having a first input connected to a regulating voltage and a second input connected to said output of said feedback circuit means for receiving said second control voltage and having an output connected to said control input of said electronic switching means, for either blocking said pulse form second control voltage from appearing at said output and at said control input or allowing the second control voltage of pulse form to be applied to said control input with pulse flanks at instants such that every connection and disconnection of said series resonant circuit means to and from either of said two substantially constant potentials takes place substantially at a null transit of said current ($i_L$) in said series resonant circuit means, said blocking or allowing application of said second control voltage being dependent upon the relative voltage values at said first and second inputs, said electronic combining circuit (4) for blocking or allowing application of said second control voltage including, or being associated with, means for locking said electronic switch in quiescent state in which it remains open and therefore not connected to either of said constant voltage potentials during an interval defined by a succession of transitions of said second control voltage of pulse form which are blocked from said output of said combining circuit;

freewheeling diodes (D3, D4) respectively connected from said respective substantially constant potentials to an input of said series-resonant circuit means which is connected for receiving voltage from said electronic switching means, said diodes (D3, D4) being connected so that they are both in a blocked state when said electronic switch and consequently said regulator are locked in a quiescent state, and a full-wave rectifier circuit interposed in circuit between said charging capacitor (5) and both said series-resonant circuit means (1) and said current-to-voltage conversion means (2), for providing a d.c. output voltage to said charging capacitor when a load circuit path is connected to said terminals.

2. The regulator of claim 1, wherein said source of regulating voltage ($U_R$) is a source of voltage having two logic levels from one to the other of which a regulating voltage intermittently changes and said electronic combining circuit is so constituted that in the event of a change of logic level in said regulating voltage ($U_R$) the output of said combining circuit produces no change in the state of said electronic switching means, but a change in the state of said electronic switching means takes place only on appearance then or thereafter of a transition of said second control voltage appearing at said second input of said combining circuit.

3. The regulator of claim 1, wherein a transformer (9) is interposed in circuit between said series resonant circuit means (1) and said full-wave rectifier (6).

4. The regulator of claim 3, wherein provision is made for a plurality of load circuit paths, said transformer having a corresponding plurality of secondary windings respectively connected to a corresponding plurality of full-wave rectifiers (6) each of which is connected to an individual charging capacitor (5) for supplying voltage to an individual load circuit path.

5. The regulator of claim 3, wherein said transformer (9) has a plurality of said secondary windings and wherein at least one of said secondary windings is connected to an individual full-wave rectifier (6) and therethrough to an individual charging capacitor (5) and wherein the secondary windings of at least one pair of said secondary windings are respectively connected to individual half-wave rectifiers (D7, D8) and therethrough respectively to individual charging capacitors (5a, 5b), said respective charging capacitors (5, 5a, 5b) being provided with respective pairs of terminals for connection to respective individual load circuit paths.

6. The regulator of claim 1, wherein said full-wave rectifier (6) is constituted as a bridge rectifier.

7. The regulator of claim 1, wherein said full-wave rectifier is constituted for the provision of two load circuit paths, said full-wave rectifier having a first diode (D5) connected between said series-resonant circuit means (1) and a first charging capacitor (5a) for energizing a first load circuit path (LKa) connected in a first of the two possible polarities, and a second diode (D6) being connected between said series-resonant circuit means (1) and a second charging capacitor (5b) for energizing a second load circuit path (LKb) having the second of said possible polarities, so that output voltages ($U_{Aa}$, $U_{Ab}$) of different polarities are provided in the respective load circuit paths.

8. The regulator of claim 1, wherein a phase shifter (10) is interposed between said output of said current-to-voltage conversion means and said electronic combining circuit (4) for setting the phase of said second control voltage for timing the switching-over of said electronic switching means (1) more closely to the null transitions of the current ($i_L$) in said series-resonant circuit (1).

9. The regulator of claim 1, wherein said series resonant circuit means (1) has elements (L, C) of such electrical dimensions that said series-resonant circuit provides an oscillation period duration which is at least ten times as great as the switching time of switch elements (T1, T2) of said electronic switching means.

10. The regulator of claim 1, wherein said electronic combining circuit (4) contains a JK flipflop (7) to the J input of which said regulating voltage ($U_R$) is supplied, and wherein the output voltage ($U_P$) of said pulse-shaping means (3) of said feedback circuit means is supplied on the one hand directly to the clock input (CK) of said flipflop and on the other hand through an inverter (8) to the reset input (R) of said flipflop.

11. The regulator of claim 1, wherein an auxiliary oscillator is provided for supplying a single pulse or a short pulse train to said control input (E) of said electronic switching means (S), if the current in said series resonant circuit means (1) is so small that said pulse-shaping means (3) does not supply a second control voltage of pulse form and if the regulating voltage ($U_R$) jumps to the potential which brings said electronic combining circuit means (4) into a condition in which said second control voltage of pulse form, if present, would be passed to input stages (E1, E2) of said electronic switching means (S).

12. Self-oscillating power stage for an inverted rectifier power supply comprising electronic switching means for capability of switching a first terminal thereof alternately to two different substantially constant voltage potentials, said electronic switching means having a control input by which said capability is controllable, said first terminal being connected to a terminal provided for connection to a load, said power stage further comprising:

a series resonant circuit (1) connected effectively in series between said first terminal of said electronic switching means and said terminal for connection to the load and providing in said series resonant circuit a frequency of resonance to the determination of which the load contributes;

phase detector means (2, 3) connected to said resonant circuit (1) for detecting a predetermined phase status of the current ($i_L$) in said series resonant circuit and to deliver a rectangular wave having steep switching flanks ($U_p$) synchronously with said phase status;

feedback circuit means for applying said switching pulse flanks to said control input (E) of said electronic switching means (S) in such a way that said electronic switching means is switched to said d.c. voltage ($U_E$) having the more positive potential while the current ($i_L$) goes into the direction towards said series resonant circuit (1) from said first terminal of said electronic switching means and said first terminal of said electronic switching means (S) is switched to the d.c. voltage of less positive potential while the current ($i_L$) in said series resonant circuit (1) goes from the series resonant circuit to said first terminal of said electronic switching means (S);

electric combining circuit means (4) provided in said feedback circuit means for intermittently preventing the switching over of said first terminal of said electronic switching means to either of said two substantially constant voltage potentials for an interval composed of an integral number of periods each beginning with a null transit of said current ($i_L$) in said series resonant circuit and ending with the next null transit of said current ($i_L$) in said series resonant circuit, said combining circuit means having a first input connected to a source of regulating voltage ($U_R$) and a second input connected for receiving said switching pulse flanks ($U_P$) and having an output connected to said control input (E) of said electronic switching means;

said electric combining circuit means (4) being constituted for intermittently blocking, in ultimate response to said regulating voltage ($U_R$), said switching pulse flanks ($U_p$) from reaching said output of said combining circuit means and locking said output thereof in a quiescent state during the blocking of said switching pulse flanks, in which quiescent state of said combining circuit means output said first terminal of said electronic switching means remains connected to that one of said two different potentials which is the more negative, and a freewheeling diode (D4) connected in such a way, between said more negative potential and an input connection of said series-resonant circuit, as to lock said power stage in a quiescent state, said phase detector means and said feedback circuit means together constituting means for applying said switching flanks to said control input at instants such that every connection and disconnection of said first terminal of said electronic switching means to and from any one of said two substantially constant voltage potentials takes place substantially at a null transit of said current ($i_L$) in said series resonant circuit.

13. The self-oscillating power stage of claim 12, wherein said series resonant circuit (1) has elements (L, C) of such electrical dimensions that said series-resonant circuit provides an oscillation period duration which is at least ten times as great as the switching time of switch elements (T1,T2) of said electronic switching means.

14. The self-oscillating power stage of claim 12, wherein a phase shifter (10) is interposed in said phase detector means, in said feedback circuit means or between said phase detector means and said feedback circuit means for setting the phase of said switching flanks ($U_p$) for timing the switching-over of said electronic switching means (1) more closely to the null transitions of the current ($i_1$) in said series-resonant circuit (1).

15. The self-oscillating power stage of claim 12, wherein said electronic switching means (S) is constituted as a complementary circuit containing two transistors (T1,T2) of different operating voltage polarity, both of said transistors being similarly selected from the group consisting of bipolar transistors and field effect transistors.

16. The self-oscillating power stage of claim 12, wherein said electronic switching means is constituted as a quasi complementary circuit containing two transistors (T1,T2) of the same operating voltage polarity, both of said transistors being similarly selected from the group consisting of bipolar transistors and field effect transistors.

17. The self-oscillating power stage of claim 12, wherein said electronic combining circuit means (4) contains a JK flipflop (7) to the J input of which said regulating voltage ($U_R$) is supplied, and wherein pulse-shaping means (3) are provided in said phase detector means for producing said rectangular wave, said rectangular wave being supplied on the one hand directly to the clock input (CK) of said flipflop and on the other hand through an inverter (8) to the reset input (R) of said flipflop.

18. The self-oscillating power stage of claim 12, wherein an auxiliary oscillator is provided for supplying a single pulse or a short pulse train to said control input (E) of said electronic switching means (S), if during operation of said power stage the current in the series-resonant circuit (1) is so small that a pulse shaping means (3) contained in said phase detector means (2, 3) fails to deliver a rectangular wave having steep switching flanks ($U_p$) and if the regulating voltage ($U_R$) jumps to the potential which brings said electronic combining circuit means (4) into a condition in which said rectangular wave, if present, would be passed to input stages (E1, E2) of said electronic switching means (S).

19. The inverted rectifier power stage of claim 12, wherein said source of regulating voltage ($U_R$) is a source of voltage having two logic levels from one to the other of which a regulating voltage intermittently changes and wherein said electronic combining circuit is so constituted that in the event of a change of logic level in said regulating voltage ($U_R$) the output of said combining circuit produces no change in the stage of said electronic switching means, but a change in the state of said electronic switching means takes place only on appearance then or thereafter of a said switching pulse flank ($U_p$) at said second input of said combining circuit.

20. A switch-controlled regulator for a d.c.-to-d.c. voltage converter having electronic means for switching an input of the regulator alternately to two different substantially constant potentials, said electronic switching means having a control input, and a charging output capacitance connected to terminals for connection to a load circuit path, said regulator further comprising:

a series-resonant circuit energy storage means having a frequency of resonance and interposed between said electronic switching means and one of said terminals to which said charging capacitance is connected;

a current-to-voltage conversion means (2), having an output and having an input interposed in circuit in series with said series-resonant circuit energy storage means, for producing a first control voltage which is as closely as possible in phase with current flow in said series-resonant circuit means, said current-to-voltage conversion means having an output for supplying said first control voltage;

feedback circuit means, including pulse shaping means (3), an output, and an input connected to said output of said voltage-to-current conversion means (2), for deriving from said first control voltage a second control voltage of pulse form substantially in phase with reversals of current flow in said series-resonant circuit means and supplying said second control voltage to said output of said feedback circuit means in such a way that when current ($i_L$) flows with positive instantaneous value into said series-resonant circuit means (1) from said electronic switching means (2), said second control voltage is of a value which, if connected through to said control input of said electronic switching means, would switch said electronic switching means to the more positive of said two different potentials, and when current ($i_L$) flow between said electronic switching means and said series-resonant circuit means has an instantaneous value which is negative, said second control voltage is of a value which, if connected through to said control input of said electronic switching means, would switch said electronic switching means to the more negative of said two different potentials;

an electronic combining circuit (4), having a first input connected to a regulating voltage and a second input connected to said output of said feedback circuit means for receiving said second control voltage and having an output connected to said control input of said electronic switching means, for either blocking said pulse form second control voltage from appearing at said output and at said control input or allowing the second control voltage of pulse form to be applied to said control input with pulse flanks at instants such that every connection and disconnection of said series resonant circuit means to and from either of said two substantially constant potentials takes place substantially at a null transit of said current ($i_L$) in said series resonant circuit means, said blocking or allowing application of said second control voltage being dependent upon the relative voltage values at said first and second inputs, said electronic combining circuit (4) being constituted for also locking said output of said electronic combining circuit in a quiescent state during blocking of said second control voltage of pulse form, in which quiescent state said electronic switching means remains, or becomes, upon the next transition of said pulse-form second control voltage, connected to that one of said two constant potentials which is the more negative;

a freewheeling diode (D4) connected in such a way, between said more negative potential and an input connection of said said series-resonant circuit means, as to lock said regulator in a quiescent state, and a full-wave rectifier circuit interposed in circuit between said charging capacitor (5) and both said series-resonant circuit means (1) and said current-to-voltage conversion means (2), for providing a d.c. output voltage to said charging capacitor when a load circuit path is connected to said terminals.

21. The regulator of claim 20, wherein an auxiliary oscillator is provided for supplying a single pulse or a short pulse train to said control input (E) of said electronic switching means (S), if the current in said series resonant circuit means (1) is so small that said pulse-shaping means (3) does not supply a second control voltage of pulse form and if the regulating voltage ($U_R$) jumps to the potential which brings said electronic combining circuit means (4) into a condition in which said second control voltage of pulse form, if present, would be passed to input stages (E1, E2) of said electronic switching means (S).

22. The regulator of claim 20, wherein said electronic combining circuit (4) contains a JK flipflop (7) to the J input of which said regulating voltage ($U_R$) is supplied, and wherein the output voltage ($U_p$) of said pulse-shaping means (3) of said feedback circuit means is supplied on the one hand directly to the clock input (CK) of said flipflop and on the other hand through an inverter (8) to the reset input (R) of said flipflop.

23. The regulator of claim 20, wherein said source of regulating voltage ($U_R$) is a source of voltage having two logic levels from one to the other of which a regulating voltage intermittently changes and said electronic combining circuit is so constituted that in the event of a change of logic level in said regulating voltage ($U_R$) the output of said combining circuit produces no change in the state of said electronic switching means, but a change in the state of said electronic switching means takes place only on appearance then or thereafter of a transition of said second control voltage appearing at said second input of said combining circuit.

24. The regulator of claim 20, wherein a transformer (9) is interposed in circuit between said series resonant circuit means (1) and said full-wave rectifier (6).

25. The regulator of claim 24, wherein provision is made for a plurality of load circuit paths, said transformer having a corresponding plurality of secondary windings respectively connected to a corresponding plurality of full-wave rectifiers (6) each of which is connected to an individual charging capacitor (5) for supplying voltage to an individual load circuit path.

26. The regulator of claim 20, wherein said full-wave rectifier (6) is constituted as a bridge rectifier.

27. The regulator of claim 20, wherein said full-wave rectifier is constituted for the provision of two load circuit paths, said full-wave rectifier having a first diode (D5) connected between said series-resonant circuit means (1) and a first charging capacitor (5a) for energizing a first load circuit path (LKa) connected in a first of the two possible polarities, and a second diode (D6) being connected between said series-resonant circuit means (1) and a second charging capacitor (5b) for energizing a second load circuit path (LKb) having the second of said possible polarities, so that output voltages ($U_{Aa}$, $U_{Ab}$) of different polarities are provided in the respective load circuit paths.

28. The regulator of claim 24, wherein said transformer (9) has a plurality of said secondary windings and wherein at least one of said secondary windings is connected to an individual full-wave rectifier (6) and therethrough to an individual charging capacitor (5) and wherein the secondary windings of at least one pair of said secondary windings are respectively connected to individual half-wave rectifiers (D7, D8) and therethrough respectively to individual charging capacitors (5a, 5b), said respective charging capacitors (5, 5a, 5b) being provided with respective pairs of terminals for connection to respective individual load circuit paths.

29. The regulator of claim 20, wherein a phase shifter (10) is interposed between said output of said current-to-voltage conversion means and said electronic combining circuit (4) for setting the phase of said second control voltage for timing the switching-over of said electronic switching means (1) more closely to the null transitions of the current ($i_L$) in said series-resonant circuit (1).

30. The regulator of claim 20, wherein said series resonant circuit (1) has elements (L, C) of such electrical dimensions that said series-resonant circuit means provides an oscillation period duration which is at least ten times as great as the switching time of switch elements (T1, T2) of said electronic switching means.

31. A switch-controlled regulator for a d.c.-to-d.c. voltage converter having electronic means for switching an input of the regulator alternately to two different substantially constant potentials, said electronic switching means having a control input, and a charging output capacitance connected to terminals for connection to a load circuit path, said regulator further comprising:

a series-resonant circuit energy storage means having a frequency of resonance and interposed between said electronic switching means and one of said terminals to which said charging capacitance is connected;

a current-to-voltage conversion means (2), having an output and having an input interposed in circuit in series with said series-resonant circuit energy storage means, for producing a first control voltage which is as closely as possible in phase with current flow in said series-resonant circuit means, said current-to-voltage conversion means having an output for supplying said first control voltage;

feedback circuit means, including pulse shaping means (3), an output, and an input connected to said output of said voltage-to-current conversion means (2), for deriving from said first control voltage a second control voltage of pulse form substantially in phase with reversals of current flow in said series-resonant circuit means and supplying said second control voltage to said output of said feedback circuit means in such a way that when current ($i_L$) flows with positive instantaneous value into said series-resonant circuit means (1) from said electronic switching means (2), said second control voltage is of a value which, if connected through to said control input of said electronic switching means, would switch said electronic switching means to the more positive of said two different potentials, and when current ($i_L$) flow between said electronic switching means and said series-resonant circuit means has an instantaneous value which is negative, said second control voltage is of a value which, if connected through to said control input of said electronic switching means, would switch said electronic switching means to the more negative of said two different potentials;

an electronic combining circuit (4), having a first input connected to a regulating voltage and a second input connected to said output of said feedback circuit means for receiving said second control voltage and having an output connected to said control input of said electronic switching means, for either blocking said pulse form second control voltage from appearing at said output and at said control input or allowing the second control voltage of pulse form to be applied to said control input with pulse flanks at instants such that every connection and disconnection of said series resonant circuit means to and from either of said two substantially constant potentials takes place substantially at a null transit of said current ($i_L$) in said series resonant circuit means, said blocking or allowing application of said second control voltage being dependent upon the relative voltage values at said first and second inputs, said electronic combining circuit (4) being constituted also for locking said combining circuit output in a quiescent state during blocking of said second control voltage of pulse form, in which quiescent state of said combining circuit output said electronic switching means remains, or becomes upon the next transition of said second control voltage, connected to that one of said two different potentials which is the more positive;

a freewheeling diode (D3) connected in such a way, between said more positive potential and an input connection of said series-resonant circuit means, as to lock said regulator in a quiescent state, and a full-wave rectifier circuit interposed in circuit between said charging capacitor (5) and both said series-resonant circuit means (1) and said current-to-voltage conversion means (2), for providing a d.c. output voltage to said charging capacitor when a load circuit path is connected to said terminals.

32. The regulator of claim 31, wherein said source of regulating voltage ($U_R$) is a source of voltage having two logic levels from one to the other of which a regulating voltage intermittently changes and said electronic combining circuit is so constituted that in the event of a change of logic level in said regulating voltage ($U_R$) the output of said combining circuit produces no change in the state of said electronic switching means, but a change in the state of said electronic switching means takes place only on appearance then or thereafter of a transition of said second control voltage appearing at said second input of said combining circuit.

33. The regulator of claim 31, wherein a transformer (9) is interposed in circuit between said series resonant circuit means (1) and said full-wave rectifier (6).

34. The regulator of claim 33, wherein provision is made for a plurality of load circuit paths, said transformer having a corresponding plurality of secondary windings respectively connected to a corresponding plurality of full-wave rectifiers (6) each of which is connected to an individual charging capacitor (5) for supplying voltage to an individual load circuit path.

35. The regulator of claim 33, wherein said transformer (9) has a plurality of said secondary windings and wherein at least one of said secondary windings is connected to an individual full-wave rectifier (6) and therethrough to an individual charging capacitor (5) and wherein the secondary windings of at least one pair of said secondary windings are respectively connected to individual half-wave rectifiers (D7, D8) and therethrough respectively to individual charging capacitors (5a, 5b), said respective charging capacitors (5, 5a, 5b) being provided with respective pairs of terminals for connection to respective individual load circuit paths.

36. The regulator of claim 31, wherein said full-wave rectifier (6) is constituted as a bridge rectifier.

37. The regulator of claim 31, wherein said full-wave rectifier is constituted for the provision of two load circuit paths, said full-wave rectifier having a first diode (D5) connected between said series-resonant circuit means (1) and a first charging capacitor (5a) for energizing a first load circuit path (LKa) connected in a first of the two possible polarities, and a second diode (D6) being connected between said series-resonant circuit means (1) and a second charging capacitor (5b) for energizing a second load circuit path (LKb) having the second of said possible polarities, so that output voltages ($U_{Aa}$, $U_{Ab}$) of different polarities are provided in the respective load circuit paths.

38. The regulator of claim 31, wherein a phase shifter (10) is interposed between said output of said current-to-voltage conversion means and said electronic combining circuit (4) for setting the phase of said second control voltage for timing the switching-over of said electronic switching means (1) more closely to the null transitions of the current ($i_L$) in said series-resonant circuit (1).

39. The regulator of claim 31, wherein said series resonant circuit means (1) has elements (L, C) of such electrical dimensions that said series-resonant circuit provides an oscillation period duration which is at least ten times as great as the switching time of switch elements (T1, T2) of said electronic switching means.

40. The regulator of claim 31 wherein said electronic combining circuit (4) contains a JK flipflop (7) to the J input of which said regulating voltage ($U_R$) is supplied, and wherein the output voltage ($U_P$) of said pulse-shaping means (3) of said feedback circuit means is supplied on the one hand directly to the clock input (CK) of said flipflop and on the other hand through an inverter (8) to the reset input (R) of said flipflop.

41. The regulator of claim 31, wherein an auxiliary oscillator is provided for supplying a single pulse or a short pulse train to said control input (E) of said electronic switching means (S), if the current in said series resonant circuit means (1) is so small that said pulse-shaping means (3) does not supply a second control voltage of pulse form and if the regulating voltage (U$_R$) jumps to the potential which brings said electronic combining circuit means (4) into a condition in which said second control voltage of pulse form, if present, would be passed to input stages (E1, E2) of said electronic switching means (S).

42. Self-oscillating power stage for an inverted rectifier power supply comprising electronic switching means for capability of switching a first terminal thereof alternately to two different substantially constant voltage potentials, said electronic switching means having a control input by which said capability is controllable, said first terminal being connected to a terminal provided for connection to a load, said power stage further comprising:

a series resonant circuit (1) connected effectively in series between said first terminal of said electronic switching means and said terminal for connection to the load and providing in said series resonant circuit a frequency of resonance to the determination of which the load contributes;

phase detector means (2, 3) connected to said resonant circuit (1) for detecting a predetermined phase status of the current (i$_L$) in said series resonant circuit and to deliver a rectangular wave having steep switching flanks (U$_p$) synchronously with said phase status;

feedback circuit means for applying said switching pulse flanks to said control input (E) of said electronic switching means (S) in such a way that said electronic switching means is switched to said d.c. voltage (U$_E$) having the more positive potential while the current (i$_L$) goes in the direction towards said series resonant circuit (1) from said first terminal of said electronic switching means and said first terminal of said electronic switching means (S) is switched to the d.c. voltage of less positive potential while the current (i$_L$) in said series resonant circuit (1) goes from the series resonant circuit to said first terminal of said electronic switching means (S);

electric combining circuit means (4) provided in said feedback circuit means for intermittently preventing the switching over of said first terminal of said electronic switching means to either of said two substantially constant voltage potentials for an interval composed of an integral number of periods each beginning with a null transit of said current (i$_L$) in said series resonant circuit and ending with the next null transit of said current (i$_L$) in said series resonant circuit, said combining circuit means having a first input connected to a source of regulating voltage (U$_R$) and a second input connected for receiving said switching pulse flanks (U$_P$) and having an output connected to said control input (E) of said electronic switching means;

said electronic combining circuit means (4) being constituted for intermittently blocking, in ultimate response to said regulating voltage (U$_R$), said switching pulse flanks (U$_P$) from reaching said output of said combining circuit means and locking said output thereof in a quiescent state during the blocking of said switching pulse flanks, in which quiescent state of said combining means output said first terminal of said electronic switching means remains connected to that one of said two different potentials which is the more positive, and a freewheeling diode (D3) connected in such a way between said more positive potential and an input connection of said series-resonant circuit, as to lock said power stage in a quiescent state, said phase detector means and said feedback circuit means together constituting means for applying said switching flanks to said control input at instants such that every connection and disconnection of said first terminal of said electronic switching means to and from any one of said two substantially constant voltage potentials takes place substantially at a null transit of said current (i$_L$) in said series resonant circuit.

43. The inverted rectifier power stage of claim 42, wherein said source of regulating voltage (U$_R$) is a source of voltage having two logic levels from one to the other of which a regulating voltage intermittently changes and wherein said electronic combining circuit is so constituted that in the event of a change of logic level in said regulating voltage (U$_R$) the output of said combining circuit produces no change in the state of said electronic switching means, but a change in the state of said electronic switching means takes place only on appearance then or thereafter of a said switching pulse flank (U$_p$) at said second input of said combining circuit.

44. The self-oscillating power stage of claim 42, wherein said series resonant circuit (1) has elements (L, C) of such electrical dimensions that said series-resonant circuit provides an oscillation period duration which is at least ten times as great as the switching time of switch elements (T1,T2) of said electronic switching means.

45. The self-oscillating power stage of claim 42, wherein a phase shifter (10) is interposed in said phase detector means, in said feedback circuit means or between said phase detector means and said feedback circuit means for setting the phase of said switching flanks (U$_P$) for timing the switching-over of said electronic switching means (1) more closely to the null transitions of the current (i$_1$) in said series-resonant circuit (1).

46. The self-oscillating power stage of claim 42, wherein said electronic switching means (S) is constituted as a complementary circuit containing two transistors (T1,T2) of different operating voltage polarity, both of said transistors being similarly selected from the group consisting of bipolar transistors and field effect transistors.

47. The self-oscillating power stage of claim 42, wherein said electronic switching means is constituted as a quasi complementary circuit containing two transistors (T1,T2) of the same operating voltage polarity, both of said transistors being similarly selected from the group consisting of bipolar transistors and field effect transistors.

48. The self-oscillating power stage of claim 42, wherein said electronic combining circuit means (4) contains a JK flipflop (7) to the J input of which said regulating voltage (U$_R$) is supplied, and wherein pulse-shaping means (3) are provided in said phase detector means for producing said rectangular wave, said rectangular wave being supplied on the one hand directly to the clock input (CK) of said flipflop and on the other hand through an inverter (8) to the reset input (R) of said flipflop.

49. The self-oscillating power stage of claim 42, wherein an auxiliary oscillator is provided for supplying a single pulse or a short pulse train to said control input (E) of said electronic switching means (S), if during operation of said power stage the current in the series-resonant circuit (1) is so small that a pulse shaping means (3) contained in said phase detector means (2, 3) fails to deliver a rectangular wave having steep switching flanks ($U_P$) and if the regulating voltage ($U_R$) jumps to the potential which brings said electronic combining circuit means (4) into a condition in which said rectangular wave, if present, would be passed to input stages (E1, E2) of said electronic switching means (S).

50. Self-oscillating power stage for an inverted rectifier power supply comprising electronic switching means for capability of switching a first terminal thereof alternately to two different substantially constant voltage potentials, said electronic switching means having a control input by which said capability is controllable, said first terminal being connected to a terminal provided for connection to a load, said power stage further comprising:

a series resonant circuit (1) connected effectively in series between said first terminal of said electronic switching means and said terminal for connection to the load and providing in said series resonant circuit a frequency of resonance to the determination of which the load contributes;

phase detector means (2, 3) connected to said resonant circuit (1) for detecting a predetermined phase status of the current ($i_L$) in said series resonant circuit and to deliver a rectangular wave having steep switching flanks ($U_p$) synchronously with said phase status;

feedback circuit means for applying said switching pulse flanks to said control input (E) of said electronic switching means (S) in such a way that said electronic switching means is switched to said d.c. voltage ($U_E$) having the more positive potential while the current ($i_L$) goes in the direction towards said series resonant circuit (1) from said first terminal of said electric switching means and said first terminal of said electronic switching means (S) is switched to the d.c. voltage of less positive potential while the current ($i_L$) in said series resonant circuit (1) goes from the series resonant circuit to said first terminal of said electronic switching means (S);

electric combining circuit means (4) provided in said feedback circuit means for intermittently preventing the switching over of said first terminal of said electronic switching means to either of said two substantially constant voltage potentials for an interval composed of an integral number of periods each beginning with a null transit of said current ($i_L$) in said series resonant circuit and ending with the next null transit of said current ($i_L$) in said series resonant circuit, said combining circuit means having a first input connected to a source of regulating voltage ($U_R$) and a second input connected for receiving said switching pulse flanks ($U_p$) and having an output connected to said control input (E) of said electronic switching means;

said electronic combining circuit means (4) being constituted for intermittently blocking, in ultimate response to said regulating voltage ($U_R$), said switching pulse flanks ($U_p$) from reaching said output of said combining circuit means and means are provided for locking said electronic switch in a quiescent state in which it remains open and therefore not connected to either of said constant voltage potentials during the interval defined by successive switching pulse flanks so blocked, and freewheeling diodes (D3,D4) respectively connected from said respective potentials to an input of said series-resonant circuit which is connected for receiving voltage from said electronic switching means, said diodes (D3,D4) being so connected that they are both in a blocked state when said electronic switch and consequently said power stage are locked in a quiescent state, said phase detector means and said feedback circuit means together constituting means for applying said switching flanks to said control input at instants such that every connection and disconnection of said first terminal of said electronic switching means to and from any one of said two substantially constant voltage potentials takes place substantially at a null transit of said current ($i_L$) in said series resonant circuit.

51. The self-oscillating power stage of claim 50, wherein a phase shifter (10) is interposed in said phase detector means, in said feedback circuit means or between said phase detector means and said feedback circuit means for setting the phase of said switching flanks ($U_P$) for timing the switching-over of said electronic switching means (1) more closely to the null transitions of the current ($i_1$) in said series-resonant circuit (1).

52. The self-oscillating power stage of claim 50, wherein said electronic switching means (S) is constituted as a complementary circuit containing two transistors (T1,T2) of different operating voltage polarity, both of said transistors being similarly selected from the group consisting of bipolar transistors and field effect transistors.

53. The self-oscillating power stage of claim 50, wherein said electronic switching means is constituted as a quasi complementary circuit containing two transistors (T1,T2) of the same operating voltage polarity, both of said transistors being similarly selected from the group consisting of bipolar transistors and field effect transistors.

54. The self-oscillating power stage of claim 50, wherein said electronic combining circuit means (4) contains a JK flipflop (7) to the J input of which said regulating voltage ($U_R$) is supplied, and wherein pulse-shaping means (3) are provided in said phase detector means for producing said rectangular wave, said rectangular wave being supplied on the one hand directly to the clock input (CK) of said flipflop and on the other hand through an inverter (8) to the reset input (R) of said flipflop.

55. The self-oscillating power stage of claim 50, wherein an auxiliary oscillator is provided for supplying a single pulse or a short pulse train to said control input (E) of said electronic switching means (S), if during operation of said power stage the current in the series-resonant circuit (1) is so small that a pulse shaping means (3) contained in said phase detector means (2, 3) fails to deliver a rectangular wave having steep switching flanks ($U_P$) and if the regulating voltage ($U_R$) jumps to the potential which brings said electronic combining circuit means (4) into a condition in which said rectangular wave, if present, would be passed to input stages (E1, E2) of said electronic switching means (S).

56. The inverted rectifier power stage of claim 50, wherein said source of regulating voltage ($U_R$) is a source of voltage having two logic levels from one to the other of which a regulating voltage intermittently changes and wherein said electronic combining circuit is so constituted that in the event of a change of logic level in said regulating voltage ($U_R$) the output of said combining circuit produces no change in the state of said electronic switching means, but a change in the state of said electronic switching means takes place only on appearance then or thereafter of a said switching pulse flank ($U_p$) at said second input of said combining circuit.

57. The self-oscillating power stage of claim 50, wherein said series resonant circuit (1) has elements (L, C) of such electrical dimensions that said series-resonant circuit provides an oscillation period duration which is at least ten times as great as the switching time of switch elements (T1,T2) of said electronic switching means.

* * * * *